United States Patent [19]

James

[11] 4,173,810
[45] Nov. 13, 1979

[54] TWIN-WHEEL CASTOR

[75] Inventor: Michael J. James, Cheltenham, England

[73] Assignee: Global Castors and Hardware Limited, Cheltenham, England

[21] Appl. No.: 914,292

[22] Filed: Jun. 9, 1978

[30] Foreign Application Priority Data

Mar. 13, 1978 [GB] United Kingdom ................. 9785/78

[51] Int. Cl.² ........................................... B60B 33/00
[52] U.S. Cl. ...................................................... 16/47
[58] Field of Search ............... 16/45, 46, 47, 48, 18 R, 16/18 A, 18 CG

[56] References Cited

FOREIGN PATENT DOCUMENTS 1023910 1/1978 Canada ........................................ 16/47
2317817 10/1974 Fed. Rep. of Germany .......... 16/18 A

*Primary Examiner*—George H. Krizmanich
*Attorney, Agent, or Firm*—Cushman, Darby & Cushman

[57] ABSTRACT

A twin-wheel castor has a moulded body with a through bearing bore in which stub axles of twin moulded wheels are received. The axles have circumferential grooves respectively engaged by two axially-spaced circumferential series of internal body projections moulded within the through bore of the body. The projections are arranged with the two series thereof angularly staggered so that in axial projection no two projections overlap. The engagement of the projections with the axle grooves provides positive retention of the wheels with snap-on assembly thereof to the body.

11 Claims, 10 Drawing Figures

TWIN-WHEEL CASTOR

BACKGROUND OF THE INVENTION

1. Field of the Invention

This invention relates to castors of the twin-wheel type, comprising two coaxial wheels mounted for independent rotation on opposite sides of a body which, when the castor is fitted, is rotatably mounted below the article to be supported. Normally, but not essentially, the body either turns on, or is fixed to, a vertical mounting spindle.

2. Description of the Prior Art

Castors conventionally require the provision of fixing means to locate the castor wheels axially with respect to, and retain them in, the castor bodies. Such means most commonly comprise spring rings which engage stub axles of the wheels which run in the bodies. Not only do the fixing means have to be produced as separate parts but fitting them complicates assembly, in many cases very considerably.

Single wheel castors are known (U.S. Pat. No. 3,991,434) in which the body mounting spindle engages a grooved stub axle of the wheel for positive retention of the latter, and although this has proved very successful in eliminating of separate fixing means it cannot be employed with a twin-wheel castor with independently rotatable wheels. In order to dispense with separate fixing means in a twin-wheel castor it has been proposed that the wheel axles should also have a snap-in fixing in the castor bodies, during assembly a moulded internal annular projection engaging a groove in the corresponding wheel axle, or vice versa. In this case, however, the body projection or groove is normally of such form that when moulded the body can snap off the moulding core. Thus there is the inherent disadvantage that positive wheel retention cannot be achieved, as in service the application of side loading can detach a wheel at the same force as the snap-off force during moulding. Furthermore, a long moulding cycle time is required as the moulding must cool and harden sufficiently to avoid damage to the moulded projection or groove when snapping off the mould core.

In order to overcome the foregoing disadvantages it has been proposed (Canadian Patent No. 780110) that the castor body should have an intermediate centrally disposed opening from opposite sides of which separate sections of the wheel mounting bore extend to receive the wheel axles. This enables wheel-retaining annular projections to be moulded at the inner ends of the bore sections with the desired rectangular profile for positive retention as it is no longer necessary for the projections to snap off a moulding core. However, this is only achieved at the considerable expense of employing three-way core withdrawal during the moulding operation, and considerable weakening of the body due to the necessity for the central opening at a highly stressed point where strength is most to be desired.

SUMMARY OF THE INVENTION

The object of the invention is to provide a twin-wheel castor with substantially positive retention of the wheels without the expense and assembly complication of the separate fixing means normally used. A further object is to provide such a castor with a rapid moulding cycle time as compared with prior proposals utilising said snap-in fixing of the castor wheels. A still further object is to provide a castor which is quicker and easier to produce, and much stronger than is the case with said prior proposal providing positive snap-in wheel fixing for a twin wheel spindle.

According to one aspect of the invention a castor comprises a body and two coaxial wheels mounted respectively on opposite sides of the body with stub axles which rotatably engage within the body, said axles having grooves which are engaged by internal body projections whereby to retain them in the body and provide snap-in assembly of the wheels to the body, said projections comprising for each axle groove at least one projection engaging that groove with the projections relatively arranged so that, in axial projection, there is no overlap of any one projection with another.

Although a single projection, which may span almost 180°, may be used for engagement with each axle groove, preferably a plurality of separate circumferentially spaced projections are provided arranged so that, in axial projection, each projection engaging one axle groove lies wholly within the space between two projections engaging the other axle groove.

Preferably the body has a through bore of constant diameter which receives the wheel axles as a running fit and within which the projections are moulded. It will be clear to persons skilled in the art that the novel projections of the invention can readily be moulded using two overlapping or interdigitated core parts which are withdrawn axially, in opposite directions, from the body moulding. Thus this moulding does not have to snap-off the core and the projections can be moulded with inwardly facing square-cut or otherwise formed abutment faces to provide positive retention of the castor wheels which will thus withstand very considerable side loading without becoming detached. The opposite and outwardly facing side faces of the projections are preferably inclined to provide a lead and thus facilitate snapping-in of the wheel axles during assembly of the castor.

The wheels are preferably identical mouldings which may have hollow stub axles, thereby economising on material and facilitating the snap-in assembly. The body is preferably moulded with a bore for a mounting spindle, offset from and perpendicular to the axle mounting bore, and this spindle may be moulded with one or more projections to provide snap-in fixing of the spindle also. Thus separate fixing means are also not required for the mounting spindle, and a castor results which comprises the minimum number of functional parts.

The circumferential series of body projections which engage an axle groove may be of any desired number, three being used in a preferred embodiment, with the projections of each series being angularly staggered, as described, so that no two projections overlap in axial projection.

Thus, according to another aspect of the invention, the body of a twin-wheel castor has a through bore in which stub axles of the wheels are received and two axially-spaced circumferential series of projections moulded within the bore for engagement with grooves in the stub axles to retain the latter, the two series of projections being relatively angularly displaced so that each projection of either series is opposite to a space between two projections of the other series.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENT

Figure 1:
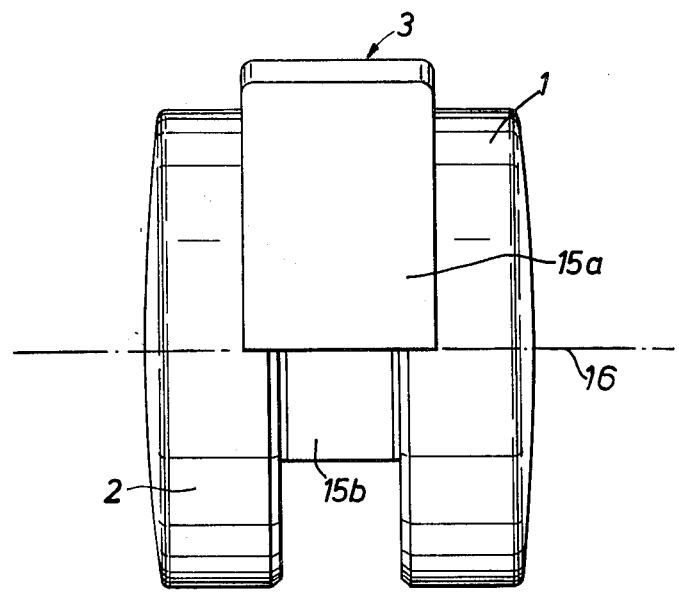
FIG. 1 is a front view of a twin-wheel castor in accordance with the invention.
Figure 2:
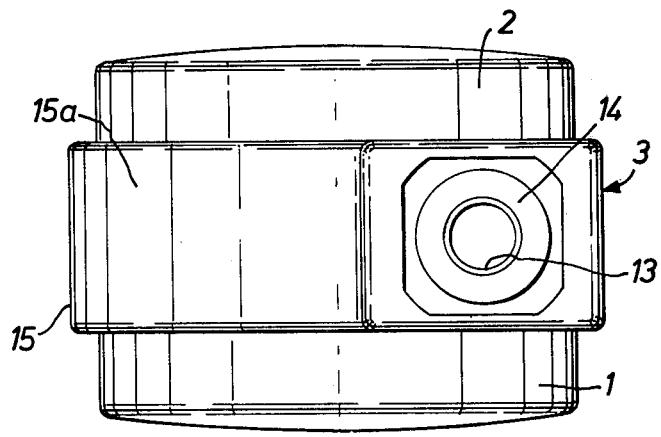
FIG. 2 is a plan view.
Figure 3:
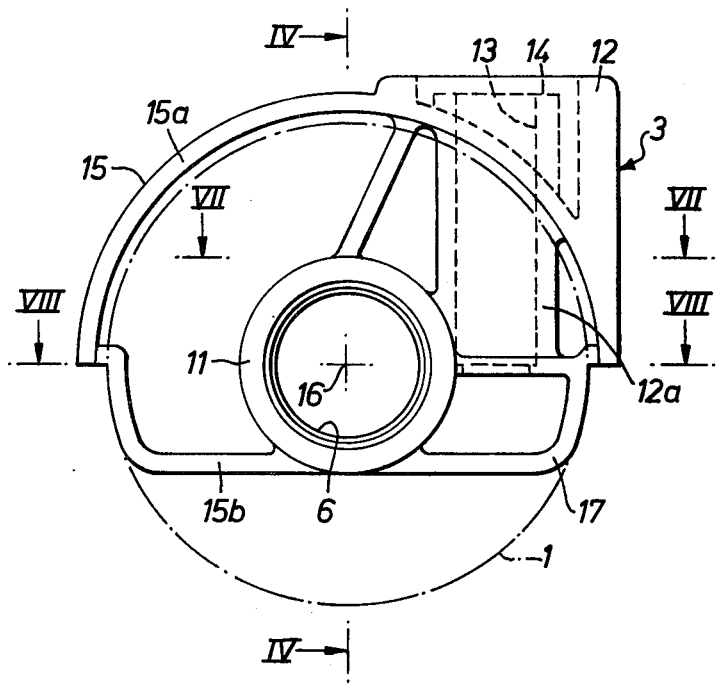
FIG. 3 is a side view, with the wheels shown in broken outline to reveal hidden detail of the castor body.
Figure 4:
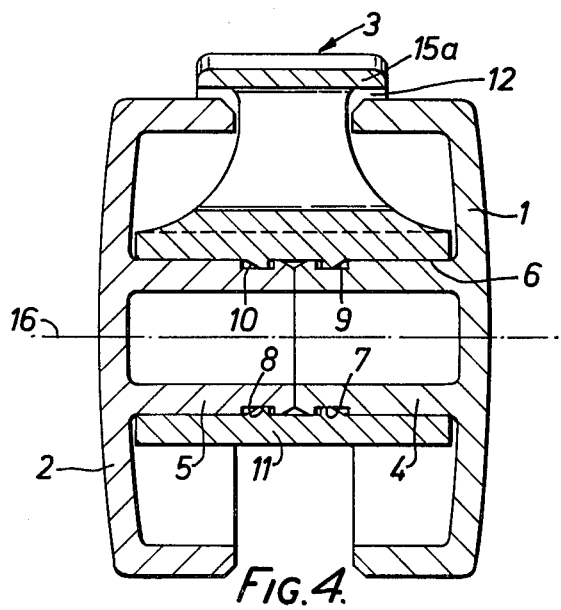
FIG. 4 is a cross-sectional view of the castor on the line IV—IV in FIG. 3.
Figure 5:
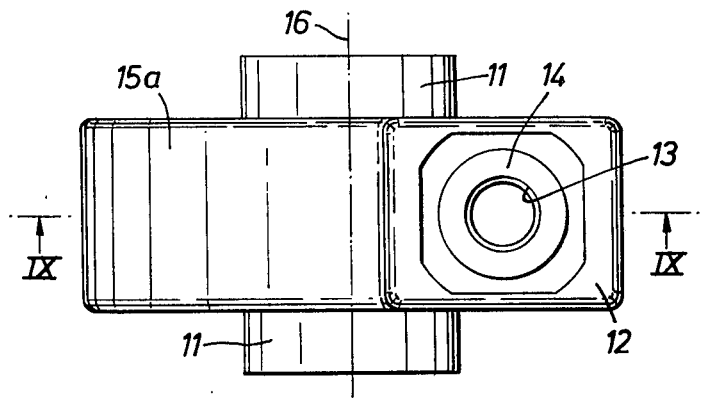
FIG. 5 is a detail plan view of the castor body.
Figure 6:
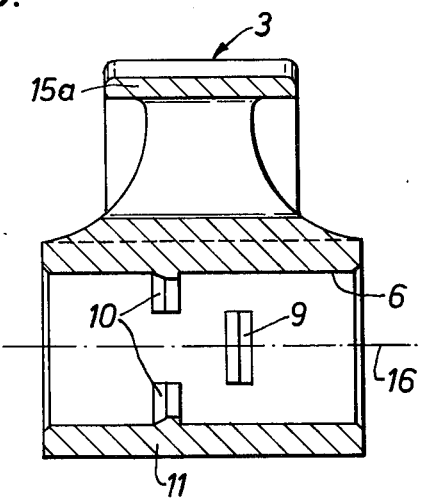
FIGS. 6 to 9 are respectively cross-sectional views of the body on the lines IV—IV, VII—VII, VIII—VIII in FIG. 3, and IX—IX in FIG. 5.
Figure 7:
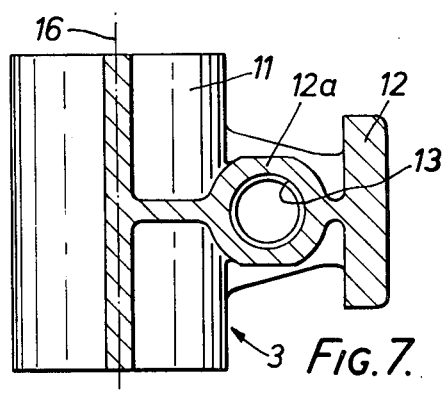
Figure 8:
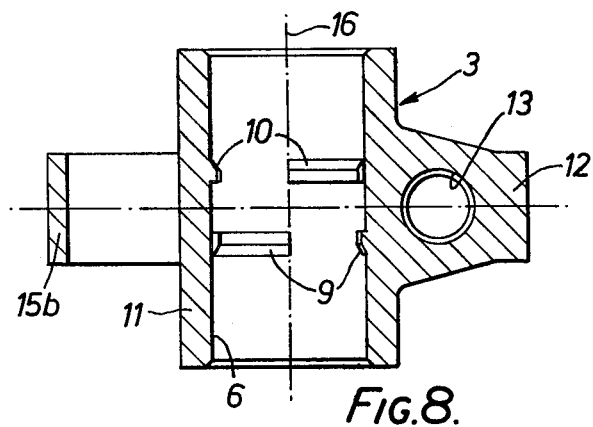

The castor assembly illustrated comprises only three functional components, namely two identical wheel mouldings 1 and 2 and a central body moulding 3. As can be seen clearly from FIG. 4, each wheel is of hollow flanged form with an integral stub axle 4 or 5 received as a running fit in a through bearing bore 6 in the body 3. For retention in the bore 6 each axle 4 or 5 has a rectangular section groove, 7 or 8, formed by machining or other suitable process and engaged by a corresponding series of projections, 9 or 10, moulded in the body bore 6.

Figure 9:
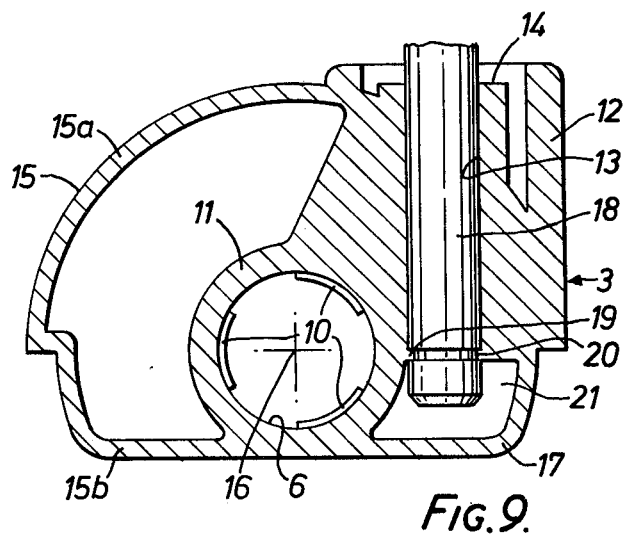

The body moulding 3, see particularly FIG. 9, is an open frame-like structure providing light weight with economy of moulding material. It comprises a tubular portion 11 within which the bore 6, in this embodiment of constant diameter, is formed; a leading webbed boss portion 12 with a tubular section 12a within which a mounting spindle bore 13 is moulded and which presents a top load-bearing annular bearing surface 14; a trailing guard or shroud portion 15 in the form of a web, with an upper section 15a outside the wheel diameter and which partially overlaps the wheel flanges above the wheel axis 16 and a narrower lower section 15b within the wheel diameter and closing off the gap between the wheel flanges below the axis 16; and a bottom closure web 17 which similarly closes off that gap on the leading side of the axis. The boss portion 12 is of the same width as the section 15a and also slightly overlaps the wheels 1 and 2 above the level of the axis 16.

Said spindle bore 13 is disposed midway between the wheels 1 and 2 and, in the usual manner, is offset from and perpendicular to the wheel axis 16. Thus when fitted the mounting spindle, the lower end of which is shown at 18 in FIG. 9, is disposed vertically and received in a mounting bore in the article to be supported. At its lower end the bore 13 is moulded with an inwardly projecting lip 19 which engages a peripheral groove 20 in the spindle 18. This retains the spindle and provides a snap-in fixing for the latter, no separate spindle fixing means being necessary. The lower end of the spindle 18 is received within the space between the lower end of the bore 13 and the web 17, so that it is concealed by the latter.

The tubular body portion 11 which provides the axial bore 6 projects symmetrically at each side of the body 3 into the hollow wheels 1 and 2, in order to provide the maximum bearing length for the axles 4 and 5. Each of the series of projections 9 or 10 which engage the axial grooves to retain the wheels consists of three similar projections which are equispaced circumferentially around the bore 6. The various sectional views of the body 3 and the fragmentary sectional view of FIG. 10 clearly show the disposition and shape of the projections 9 and 10. The two series of projections are angularly displaced relatively to each other so that, in axial projection, each projection engaging one axial groove is wholly received within the space between two projections engaging the other axial groove. This enables the projections to be moulded employing two interdigitated core parts which on withdrawal from the body moulding are moved apart along the axis 16.

Figure 10:
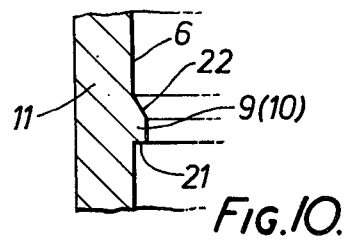
FIG. 10 is a fragmentary detail sectional view of a wheel-retaining projection of the body to a larger scale.

To provide positive retention of the wheels 1 and 2, so that a very considerable side force far greater than that ever likely to be encountered in service is required to detach one of the wheels, each projection 9 or 10, see particularly FIG. 10, has a square-cut inwardly facing abutment face 21 providing a rectangular step which engages the inner side of the corresponding rectangular axial groove 7 or 8 for retention of the wheel concerned. Facing outwardly of the bore 6 each projection 9 or 10 has an inclined face 22 which provides a lead facilitating snap-in assembly of the corresponding wheel to the body 3. The use of three projections 9 or 10 in each series thereof spreads the load very satisfactorily around the bore 6 and is the preferred arrangement, but it will be appreciated that any desired number of projections can be employed for each series thereof or indeed each axle groove may be engaged by only a single projection.

The foregoing is a description of a preferred embodiment of the invention and is given here by way of example only. The invention is not to be taken as limited to any of the specific features as described but comprehends all such variations thereof as come within the scope of the appended claims.

I claim:

1. A twin-wheel castor comprising a body and two coaxial wheels mounted respectively on opposite sides of the body with separate stub axles of the wheels rotatably engaging within the body, said axles having grooves which are engaged by internal projections of said body whereby to retain the axles in the body and provide snap-in assembly of the wheels to the body, said projections comprising for engagement with each axle groove at least one projection with the projections relatively arranged so that, in axial projection, there is no overlap of any one of the projections with another.

2. A castor according to claim 1, wherein said body has a through bore of constant diameter in which said stub axles engage as a running fit and within which said projections are moulded.

3. A castor according to claim 1, wherein said projections are moulded with inwardly facing abutment faces of such shape and said axle grooves have a cross-sectional shape such that the engagement of said grooves with said abutment faces provides positive retention of the wheels.

4. A castor according to claim 3, wherein said abutment faces and the cooperating sides of said axle grooves are of rectangular configuration.

5. A castor according to claim 1, wherein the opposite outwardly facing side faces of said projections are inclined to provide a lead which facilitates snapping-in of the wheel axles during assembly of the castor.

6. A castor according to claim 1, wherein said wheels are identical mouldings with integral hollow stub axles of unsplit annular form.

7. A castor according to claim 1, wherein said body is a moulding with a through bore of constant diameter in which said stub axles engage as a running fit, and with a further bore offset from and perpendicular to said through bore, said further bore being adapted to receive a mounting spindle and moulded with at least one internal projection for engagement with the mounting spindle and to provide snap-in fixing for the spindle also.

8. A castor according to claim 1, wherein said projections are arranged in two axially-spaced circumferential series each of which comprises at least three equiangularly spaced projections, the two series of projections being angularly staggered so that no two of the projections overlap in axial projection.

9. A twin-wheel castor comprising a body moulded with a through bearing bore, and two moulded wheels with integral stub axles received in said bearing bore and each of which has a circumferential groove, said body having two axially-spaced circumferential series of internal projections moulded within said bore for respective retaining engagement with said stub axle grooves, the two series of projections being relatively angularly displaced so that each projection of either of said series thereof is opposite to a space between two projections of the other of said series of projections.

10. A castor according to claim 9, wherein each of said projections has an inclined outwardly facing side face and an inwardly facing abutment face which has a configuration which engages the inner side of the corresponding one of said axle grooves to provide positive retention of the wheel axles, and said body is moulded with a mounting spindle bore with an internal projection which provides snap-in fixing of said spindle in the body, said mounting spindle bore being axially offset from and perpendicular to said through bore.

11. A castor according to claim 9, wherein said body moulding comprises a tubular portion within which said through bore is moulded, an adjoining leading webbed boss portion in which a mounting spindle bore is moulded and which partially overlaps said wheels, and a web-like trailing shroud portion with an upper section which extends from said boss portion to partially overlap said wheels and a narrower lower section which extends between the wheels from said tubular portion.

* * * * *